US010942106B2

United States Patent
Zhang et al.

(10) Patent No.: US 10,942,106 B2
(45) Date of Patent: Mar. 9, 2021

(54) PARTICLE CHARACTERIZATION APPARATUS AND METHOD

(71) Applicant: KONINKLIJKE PHILIPS N.V., Eindhoven (NL)

(72) Inventors: Qiu Shi Zhang, Shanghai (CN); Shuang Chen, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/485,226

(22) PCT Filed: Feb. 14, 2018

(86) PCT No.: PCT/EP2018/053718
§ 371 (c)(1),
(2) Date: Aug. 12, 2019

(87) PCT Pub. No.: WO2018/149889
PCT Pub. Date: Aug. 23, 2018

(65) Prior Publication Data
US 2019/0368993 A1     Dec. 5, 2019

(30) Foreign Application Priority Data

Feb. 16, 2017    (WO) ................ PCT/CN2017/000178
Apr. 20, 2017    (EP) ..................................... 17167228

(51) Int. Cl.
     *G01N 15/02*      (2006.01)
     *G01N 15/14*      (2006.01)

(52) U.S. Cl.
     CPC ..... *G01N 15/0205* (2013.01); *G01N 15/1429* (2013.01); *G01N 15/1459* (2013.01);
(Continued)

(58) Field of Classification Search
     CPC .......... G01N 15/0205; G01N 15/1429; G01N 15/1459; G01N 2015/145; G01N 2015/1493; G01N 2015/1497
(Continued)

(56) References Cited

U.S. PATENT DOCUMENTS 4,211,487 A *   7/1980   Morrison ........... G01N 15/0205
                                              250/574
4,329,054 A *   5/1982   Bachalo ............. G01N 15/0205
                                              356/336
(Continued)

FOREIGN PATENT DOCUMENTS

WO         2009/117028       9/2009

OTHER PUBLICATIONS

Su, et al: "Development and Characterization of an Aerosol Time-of-Flight Mass Spectrometer with increased Detection Efficiency", Analytical Chemistry, American Chemical Society, vol. 76, No. 3, Dec. 30, 2003.

(Continued)

*Primary Examiner* — Roy M Punnoose (57) ABSTRACT

An apparatus is provided for determining particle characteristics, in which a flow path is generated containing particles to be analyzed. A light detection system detecting light received from a measurement zone which has been scattered by the particles. A time duration for which a particle remains in the measurement zone is measured to determine an effective aerodynamic particle diameter and a peak detected received light intensity is measured to determine an effective optical particle diameter. A further particle parameter is also obtained relating to the shape and/or density of the particle. This approach enables more information than only a particle size to be obtained using a single-stage optical analysis system. The additional infor- (Continued)

mation may be used to characterize the particles more accurately.

15 Claims, 7 Drawing Sheets

(52) U.S. Cl.
CPC .......... G01N 2015/145 (2013.01); G01N 2015/1493 (2013.01); G01N 2015/1497 (2013.01)

(58) Field of Classification Search
USPC .......................................................... 356/436
See application file for complete search history.

(56) References Cited

U.S. PATENT DOCUMENTS

| | | |
|---|---|---|
| 5,561,515 A | 10/1996 | Hairston |
| 7,932,490 B2 | 4/2011 | Wang |
| 9,335,244 B2 | 5/2016 | Han |
| 9,880,097 B2 * | 1/2018 | Evenstad .............. G01N 21/27 |
| 2009/0039249 A1 | 2/2009 | Wang |
| 2014/0247450 A1 * | 9/2014 | Han .................. G01N 15/0211 |
| | | 356/338 |

OTHER PUBLICATIONS

Cross, et al: "Laboratory and Ambient Particle Density Determinations using Light Scattering in Conjunction with Aerosol Mass Spectrometry", Aerosol Science and Technology, vol. 41, No. 4, Mar. 5, 2007.
Murphy, et al: "Particle density inferred from simultaneous optical and aerodynamic diameters sorted by composition", Journal of Aerosol Science, vol. 35, No. 1, Aug. 26, 2003.
https://en.wikipedia.org/wiki/Electrical_mobility, Publish date: Jul. 31, 2019.
International Search Report and Written Opinion dated Apr. 26, 2018 for International Application No. PCT/EP2018/053718 Filed Feb. 14, 2018.

* cited by examiner

PARTICLE CHARACTERIZATION APPARATUS AND METHOD

CROSS REFERENCE TO RELATED APPLICATIONS

This application is the U.S. National Phase application under 35 U.S.C. § 371 of International Application No. PCT/EP2018/053718 filed Feb. 14, 2018, published as WO 2018/149889 on Aug. 23, 2018, which claims the benefit of European Patent Application Number 17167228.0 filed Apr. 20, 2017 and Application Number PCT/CN2017/000178 filed Feb. 16, 2017. These applications are hereby incorporated by reference herein.

FIELD OF THE INVENTION

This invention relates to a method and apparatus for characterizing particles.

BACKGROUND OF THE INVENTION

It is well known that it is desirable to monitor pollution levels, such as particulate pollutants. Various sensing devices are known, which for example provide a particle concentration level for particles below a certain size. Optical particle sensing approaches are for example known based on optical scattering.

It is also of interest to know the particle size or particle size distribution of a pollutant for example to identify the pollutant and hence the cause or source of the pollution.

Various particle sizing techniques are known. These techniques aim to measure a particle equivalent diameter, and there are different definitions for this equivalent diameter. For example, a particle effective optical diameter ($d_{op}$) is an equivalent diameter reported from a Mie light scattering measurement technique. A particle effective aerodynamic diameter ($d_{ae}$) is the equivalent diameter of a spherical particle with standard density which settles at the same terminal velocity as the particle of interest.

There is a difference between the two diameters, which results from the shape (e.g. spherical vs. non-spherical) and density (as compared to a standard density of 1 g/cm$^3$) of the particle.

It would be of interest to obtain additional information about the particle characteristics other than a simple equivalent diameter. For example, efforts have been made to measure a sub-micron particle shape factor and density in scientific application scenarios. Typically, two or more equivalent particle diameters are measured by corresponding measurement techniques connected in series along a gas flow. These cumbersome instruments usually require a large space to set up and they require skilled operators.

The article "Laboratory and Ambient Particle Density Determinations using Light Scattering in Conjunction with Aerosol Mass Spectrometry" of Eben S. Cross et. al. in Aerosol Science and Technology, vol. 41. No. 4, 5 Mar. 20007 pages 343-359 discloses a mass spectrometer with an optical stage for determining a vacuum aerodynamic diameter from a time of flight measurement and a particle optical diameter from a scattered light intensity measurement.

US 2009/09249 discloses a system for estimating size segregated aerosol mass concentration. It combines scattered light intensity measurement and time of flight measurement as a particle traverses an interrogation beam.

There remains a need for an analysis system which enables more information about particles to be obtained than a simple diameter measurement, but with a low cost and compact arrangement.

SUMMARY OF THE INVENTION

The invention is defined by the claims.

According to examples in accordance with an aspect of the invention, there is provided an apparatus for determining particle characteristics, comprising:

a flow system for generating a flow path between an inlet and an outlet along which an accelerating flow is to be provided containing particles to be analyzed;

a light source for providing light to the flow path, wherein the envelope of the light defines a measurement zone, the measurement zone having a length of more than 1 cm;

a light detector for detecting light received from the measurement zone which has been scattered by the particles; and a controller for analyzing the detected received light, wherein the controller is adapted to:

determine a time duration for which a particle remains in the measurement zone, and thereby determine an effective aerodynamic particle diameter;

determine a peak detected received light intensity and thereby determine an effective optical particle diameter;

determine a further particle parameter relating to the shape and/or density of the particle.

This apparatus enables multiple parameters to be obtained about detected particles using a single optical analysis system. In particular, both effective optical and aerodynamic diameters are obtained, as well as further shape or density information. This is possible by making use of a relatively long measurement zone so that particle transit time information is obtained as an additional variable to the light intensity. The use of an accelerating flow contributes to the difference in transit time (i.e. the time the particles are resident in the measurement zone) for particles with different aerodynamic diameters, hence enables particle sizing.

The measurement zone length may be between 1 cm and 6 cm.

The additional information may be used to determine particle type and composition.

The light source is preferably a laser.

In a basic implementation, the controller may be adapted to determine the further particle parameter as a ratio between a particle shape parameter and a particle density. This ratio may be obtained directly from the two effective particle diameters without any further measurements.

In another implementation, the controller is adapted to:

analyze a level of variation of the detected received intensity over time and thereby derive a particle shape parameter as a first further particle parameter; and determine a particle density as a second further particle parameter.

The variation of the peak intensity may be caused by rotation of a non-spherical particle during the scattering measurement. By measuring the level of signal variation, a measure may be obtained relating to the level of uniformity of the particle shape.

The apparatus may further comprise:

a first polarizer between the light source and the measurement zone; and a second polarizer between the measurement zone and the light detector, wherein the second polarizer has a first portion with a matching polarization to the first polarizer and a second portion with an orthogonal polarization to the first polarizer.

In this way, it becomes possible to determine the proportion of light which has undergone a polarization shift compared to light that has not undergone a polarization shift, and hence to differentiate between scattering amplitudes in the Mie scattering S-matrix, which in turn depends on the particle shape.

For example, the controller may be adapted to:

analyze the peak detected received light intensity through the first and second portions of the second polarizer to derive a particle shape parameter as a first further particle parameter; and determine a particle density as a second further particle parameter.

The apparatus may further comprise:
an outer enclosure;
a fan connected to the outlet;
a filter arrangement coupled to a further pair of inlets; and
a flow deflector arrangement for controlling the flow from the filter arrangement and for controlling the flow path.

The filter arrangement is used to control the flow. For example, by suitable design of the filter arrangement the flow along the flow path may be controlled to introduce a single particle at a time into the measurement zone. This for example involves diluting the particle concentration introduced from the inlet by streams of clean air from the filter arrangement.

The filter arrangement may comprise first and second filters on opposite sides of the flow path, and the flow deflector arrangement comprises corresponding first and second flow deflectors.

The apparatus may be adapted to provide a uniform acceleration of the flow along the flow path within the measurement zone.

Examples in accordance with another aspect of the invention provide a method for obtaining characteristics, comprising:

generating an accelerating flow containing particles between an inlet and an outlet;

controlling a light source to provide light to the flow path, wherein the envelope of the light defines a measurement zone, the measurement zone having a length of more than 1 cm;

detecting light received from the measurement zone which has been scattered by the particles;

determining a time duration for which a particle remains in the measurement zone, and thereby determining an effective aerodynamic particle diameter;

determining a peak detected received light intensity and thereby determining an effective optical particle diameter; and determining a further particle parameter relating to the shape and/or density of the particle.

This method makes use of a prolonged intensity measurement so that both time duration and intensity become significant, and this provides two measurements from a single optical analysis stage. An accelerating flow field ensures that particles of different aerodynamic sizes have different transit times in the measurement zone. This in turn enables more information than just a particle diameter to be derived.

The method may comprise: determining the further particle parameter as a ratio between a particle shape parameter and a particle density.

The method may instead comprise:
analyzing a level of variation of the detected received intensity over time and thereby deriving a particle shape parameter as a first further particle parameter; and
determining a particle density as a second further particle parameter.

The method may instead comprise:
providing polarization of the light before the measurement zone using a first polarizer;
providing polarization of the light after the measurement zone using a second polarizer having a first portion with a matching polarization to the first polarizer and a second portion with an orthogonal polarization to the first polarizer;
analyzing the peak detected received light intensity through the first and second portions of the second polarizer to derive a particle shape parameter as a first further particle parameter; and
determining a particle density as a second further particle parameter.

The method may be used to differentiate between different types of pollen, e.g. in an allergy detection device. The particles described in this disclosure may be pollen. The different particle characteristics may be used to differentiate between different types of pollen.

A filtered air flow may be provided towards the measurement zone thereby to control the flow path. This may be performed to focus the flow path, to generate the desired accelerating flow field and to dilute the particle number concentration in the flow from the inlet to ensure that a single particle passes the measurement zone at a time. A uniform acceleration of the flow along the flow path may for example be provided within the measurement zone.

The invention may be implemented at least in part in software.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an apparatus for determining particle characteristics, in which a flow path is generated containing particles to be analyzed, in which an accelerating flow is provided. A light detection system detects light received from a measurement zone which has been scattered by the particles. A time duration for which a particle remains in the measurement zone is measured to determine an effective aerodynamic particle diameter and a peak detected received light intensity is measured to determine an effective optical particle diameter. A further particle parameter is also obtained relating to the shape and/or density of the particle.

This approach enables more information than only a particle size to be obtained using a single-stage optical analysis system. The additional information may be used to characterize the particles more accurately.

Figure 1:
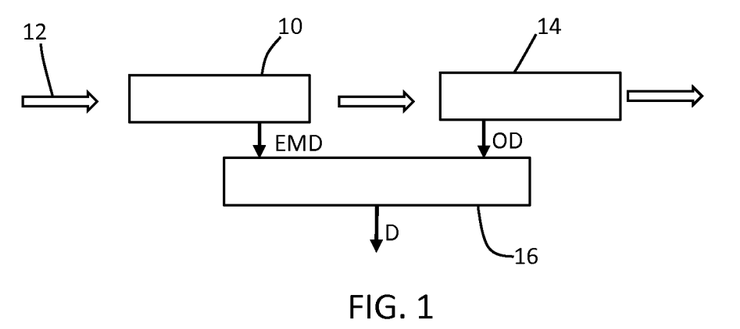
FIG. 1 shows a first possible way to obtain information relating to particles in addition to the particle diameter.
Figure 2:
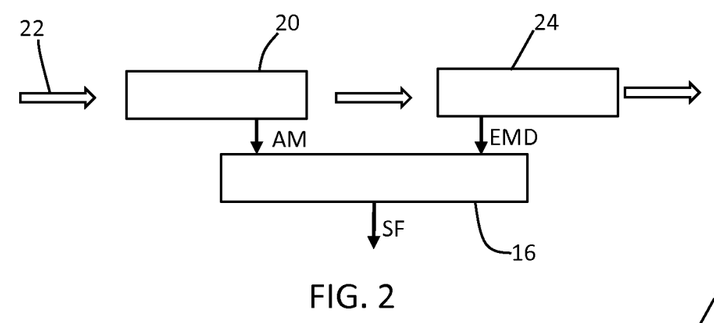
FIG. 2 shows a second possible way to obtain information relating to particles in addition to the particle diameter.

FIGS. 1 and 2 show examples of possible configurations for obtaining information additional to an equivalent diameter measurement.

FIG. 1 shows how multiple measurements may be used in sequence to obtain a particle density measurement.

The system comprises a differential mobility analyzer 10 to which a sample flow 12 is provided. This provides an electrical mobility diameter EMD as its output. The flow passes to an optical particle counter 14 which provides an optical diameter OD as its output. The two outputs are processed by processor 16 which provides a density measurement D.

FIG. 2 shows how multiple measurements may be used in sequence to obtain a shape factor (which is an indication of how far the shape deviates from a perfect sphere).

The system comprises an aerosol particle mass analyzer 20 to which a sample flow 22 is provided. This provides an aerosol mass AM as its output. The flow passes to a scanning mobility particle sizer 24 which provides an electrical mobility diameter EMD as its output. The two outputs are processed by processor 26 which provides a shape factor measurement SF.

A scanning mobility particle sizer essentially performs the same function as a differential mobility analyzer but it can also select particles with multiple electrical mobility values by changing the electric field intensity.

These approaches thus require complicated apparatus in order to enhance the basic measurement of effective diameter.

The invention is instead based on the use of a single optical stage with a wide light source beam such as a laser beam to measure particle effective optical diameter (based on the intensity of a pulse received by the photon detector) and particle transit time and/or terminal velocity (based on the width of the pulse) in a steady state accelerating flow field. By steady state is meant that the flow conditions are temporally constant, i.e. the flow has the constant velocity (and acceleration) at different points along the flow path over time.

The wide light source beam defines a measurement zone. In particular, the envelope the light source beam determines the length of the measurement zone. This means that the transit time through the measurement zone can be determined based on analysis of reflected light, and does not require any additional timing measurements.

Thus, separate components are not needed for a time of flight measurement. Only an incident beam, for example generated by a laser diode and beam shaping optics, is needed.

A pre-defined relationship may be used to convert the transit time and/or terminal velocity to an effective aerodynamic diameter. The transit time is more easy to measure as it related directly to the signal width. The effective aerodynamic and optical diameters may then be processed to yield additional information about the particle, such as one or more of the particle density, shape factor, type and composition.

By way of example, a laser beam with width 4 cm is wide enough to identify differences in particle terminal velocity and flight time induced by differences in particle effective aerodynamic diameter, and hence particle density and composition. More generally, the measurement zone has a length more than 1 cm, for example a spatial length in the range 1 cm to 6 cm. The larger the length, the greater the sensitivity, so there is a trade-off between sensitivity and sensor size.

This additional information can thus be obtained without requiring multiple sensing instruments and enables portable sensors to obtain particle size, type and composition with reasonable accuracy in a quick and cost-effective manner.

The invention combines optical sensing with flow control.

Figure 3:
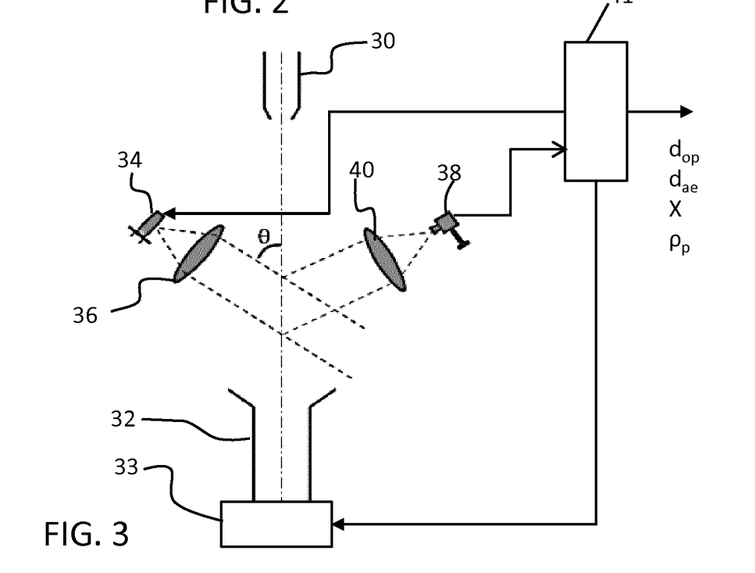
FIG. 3 shows a first example of a particle size determining apparatus and shows the parts relating to the optical system.

FIG. 3 shows the optical sensing features.

The optical apparatus comprises an inlet 30 which connects to the particle source. A flow path is defined to an outlet 32 which is connected to a negative pressure source 33 such as a fan, to control the flow.

A laser diode 34 provides an illumination beam, which is collimated by collimator lens 36 and then illuminates a length of the flow path. The envelope of the laser signal defines the length of the flow path which in turn defines a measurement zone. A photon detector 38 such as an avalanche photodiode collects scattered light after focusing by lens 40.

The light for example has a top-hat intensity profile. A lenslet array or a Powell lens may be used to convert a Gaussian laser output into incident light with a uniform intensity.

The photon detector signal is provided to a controller 41, which also controls the laser source 34 and the fan 33. The controller outputs the effective optical diameter $d_{op}$ the effective aerodynamic diameter $d_{ac}$ and one or more further parameters such as a shape factor $\chi$ and a density $\rho_p$ or a ratio of such values. It may also output an identification of the particle type by mapping the particle characteristics to known pollutants using a database.

Figure 4:
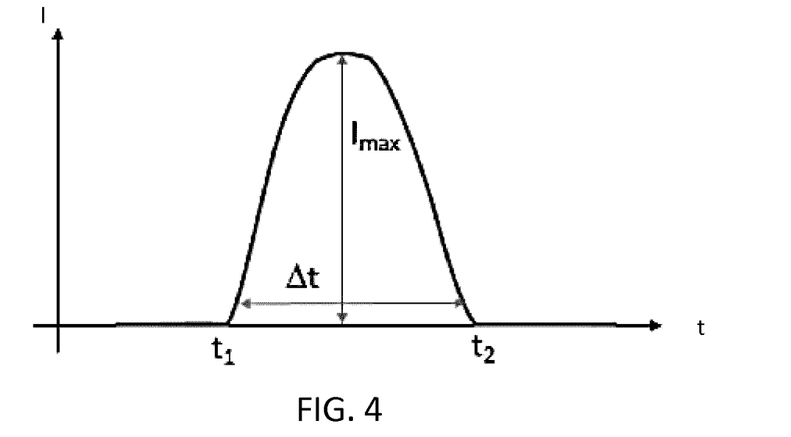
FIG. 4 shows an example of the collected light intensity signal.

FIG. 4 shows an example of a signal recorded by the photon detector 38 over time. The pulse relates to the transit of a single particle. It has a maximum intensity $I_{max}$ and a time duration $\Delta t$ between times $t_1$ and $t_2$. The measurement zone corresponds to the position of the particle between times $t_1$ and $t_2$.

The light is collected at a pre-defined angle. The light intensity signal of FIG. 4 is converted to digital form using an analog to digital converter and recorded as a time series, within the controller 41.

Due to the constraints of laser power and analog to digital conversion resolution and signal to noise ratio, a low angle θ between the incident laser light and particle beam is used so that the laser power is concentrated into a small area but a sufficient length of illumination of the measurement zone is enabled. This is explained further below. The use of an avalanche photon detector enables an increase in the sensitivity of the scattered light intensity measurement.

The width of the pulse Δt in FIG. 4, i.e. the transit time, relates to the velocity of the particle in the laser beam, which is determined by the aerodynamic diameter of the particle, while the height of the signal $I_{max}$ represents the light intensity that is scattered off the particle, which is proportional to the effective optical diameter of the particle.

Thus, the single optical measurement provides multiple sources of information concerning the particle characteristics. In particular, by analyzing the two effective diameters, one or more of the particle density, shape factor and particle type can be determined.

Figure 5:
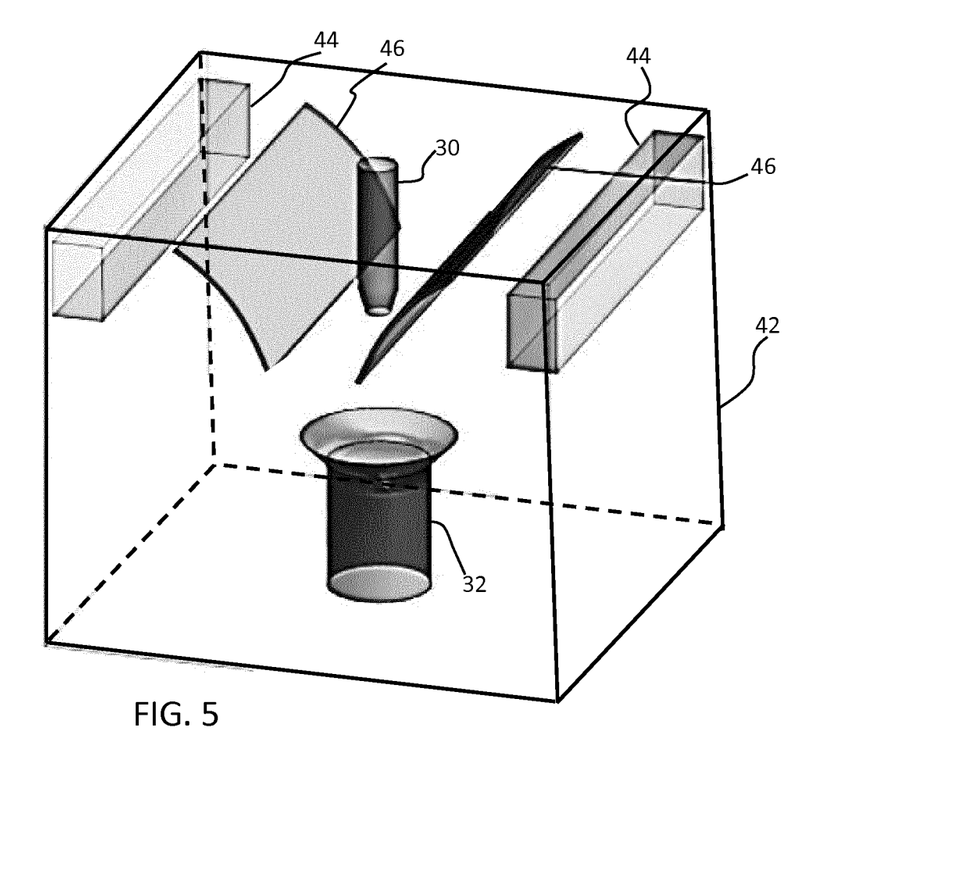
FIG. 5 shows the parts of the apparatus relating to flow control.
Figure 6:
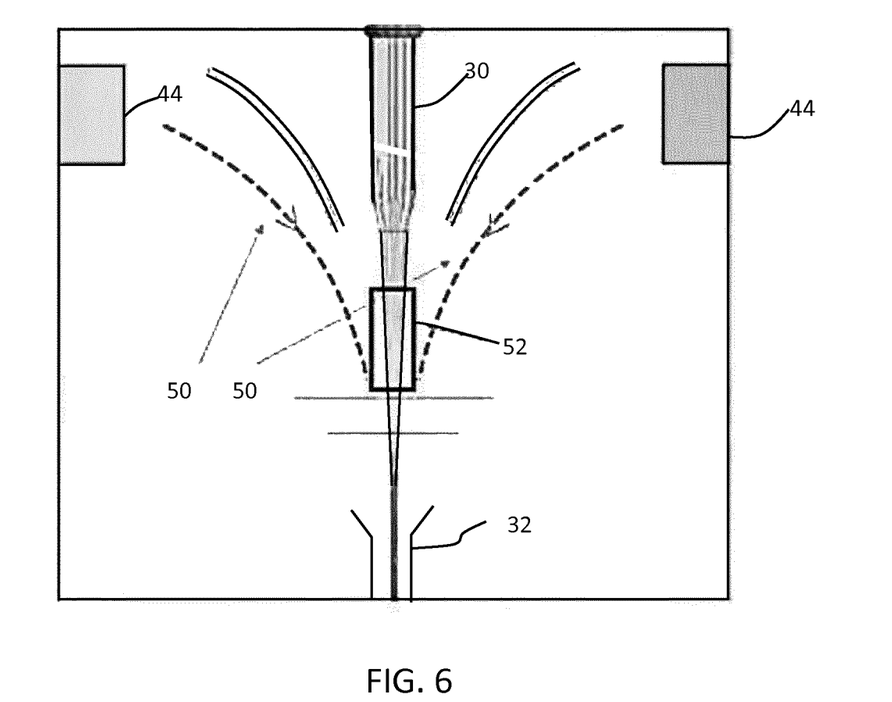
FIG. 6 shows the flow paths within the apparatus.
Figure 7:
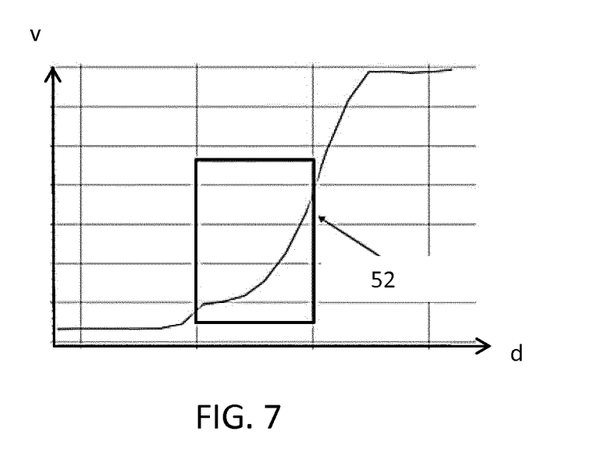
FIG. 7 shows the velocity profile within the measurement zone.
Figure 8:
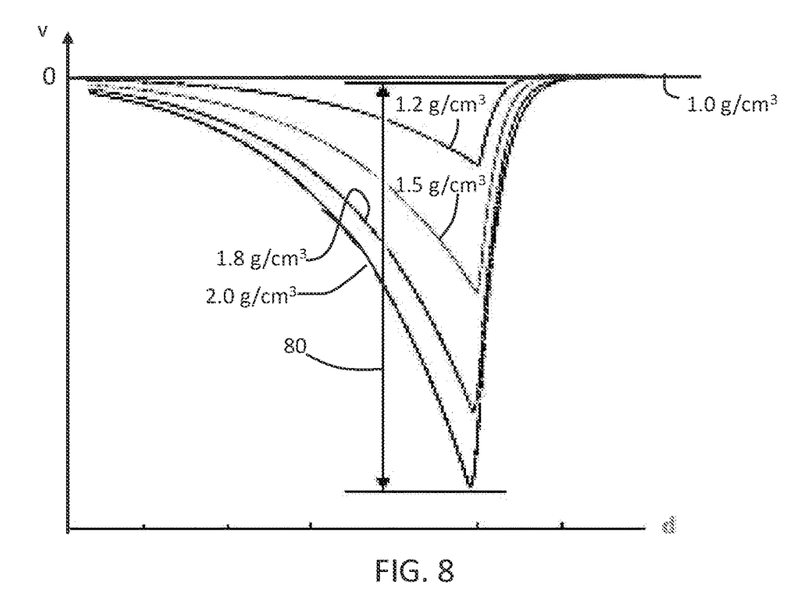
FIG. 8 shows the effect of particle density and hence the particle aerodynamic diameter on the velocity reached in the accelerating flow field.
Figure 9:
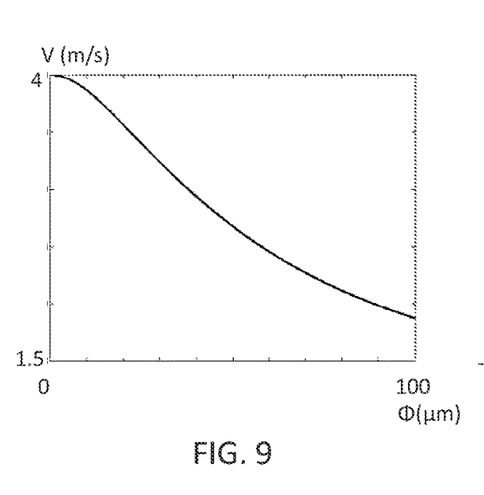
FIG. 9 shows the terminal velocity versus the particle diameter.
Figure 10:
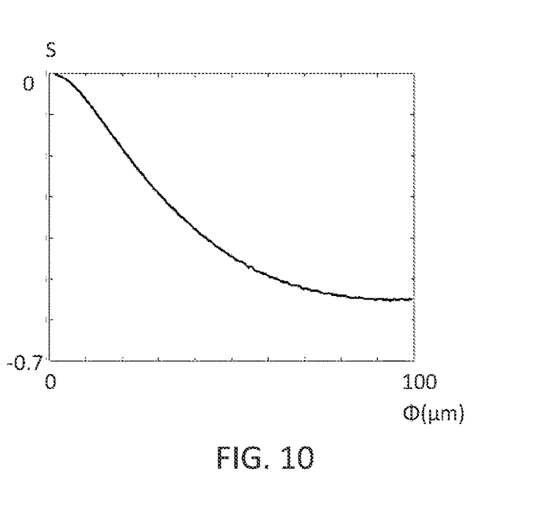
FIG. 10 shows the sensitivity of the terminal velocity versus the particle diameter.
Figure 11:
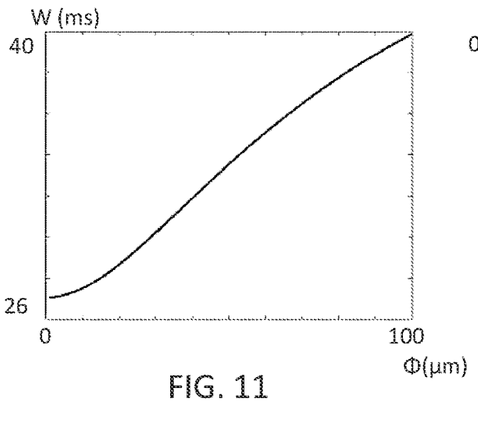
FIG. 11 shows the pulse width versus the particle diameter.
Figure 12:
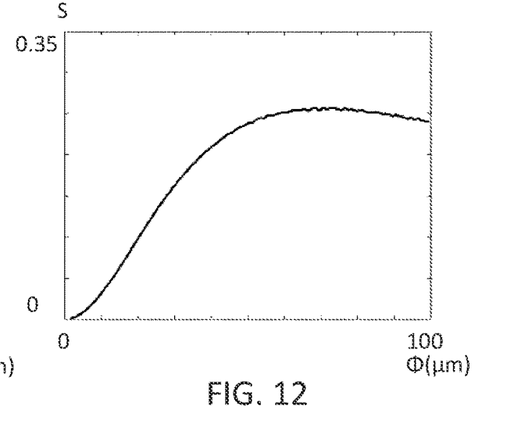
FIG. 12 shows the sensitivity of the pulse width versus the particle diameter.
Figure 13:
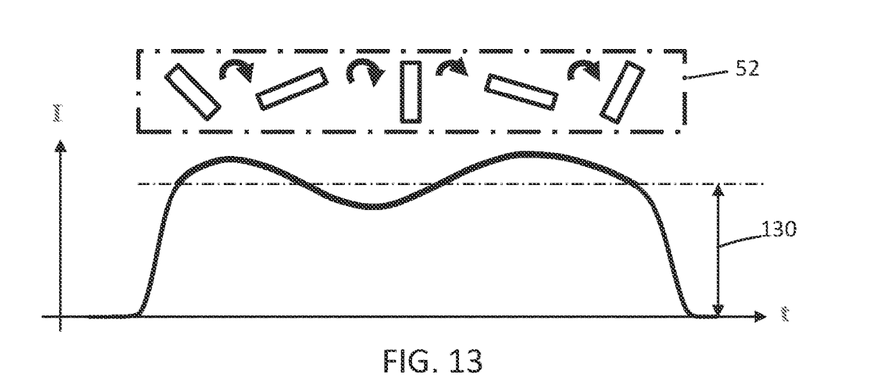
FIG. 13 shows a collected signal for a non-spherical particle.
Figure 14:
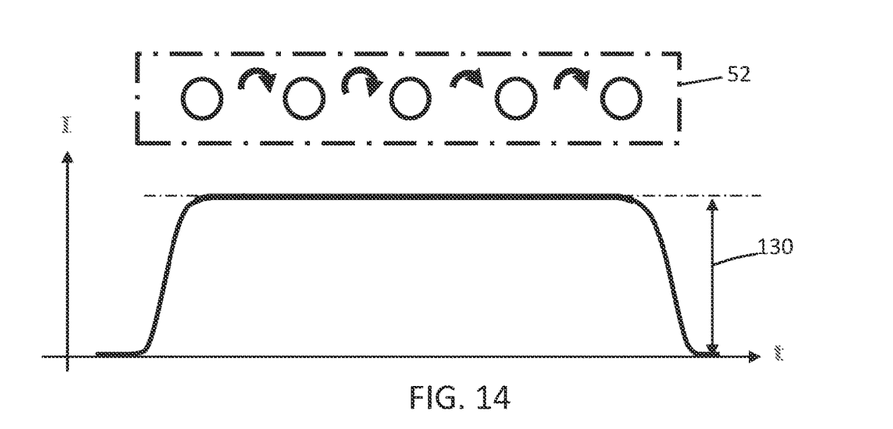
FIG. 14 shows a collected signal for a spherical particle.
Figure 15:
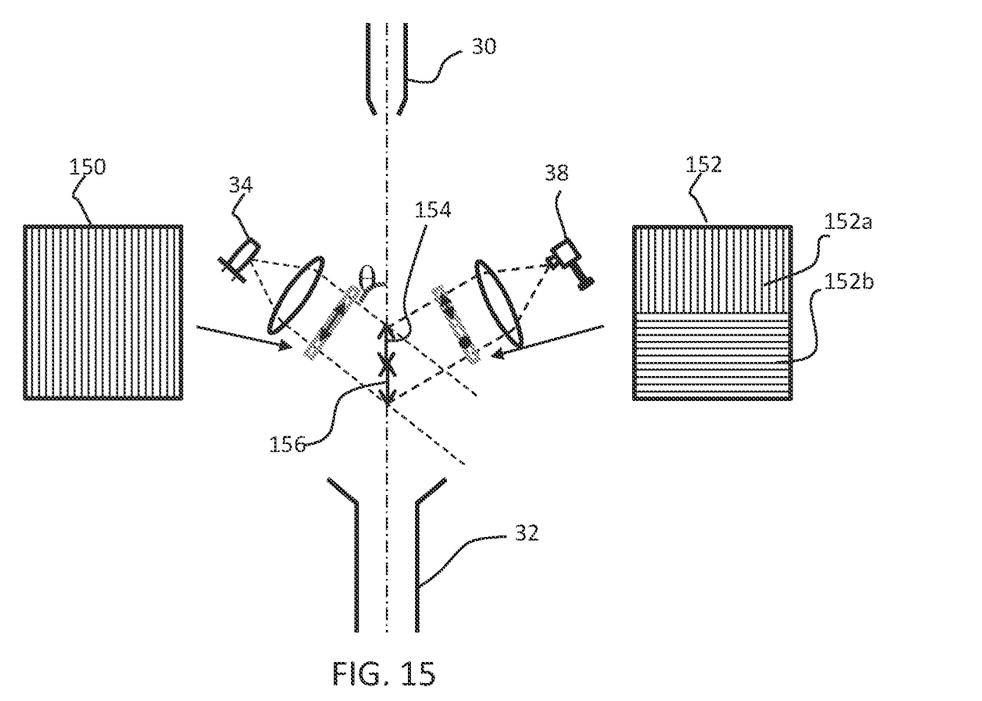
FIG. 15 shows an apparatus which uses polarization to enable determination of a shape parameter.
Figure 16:
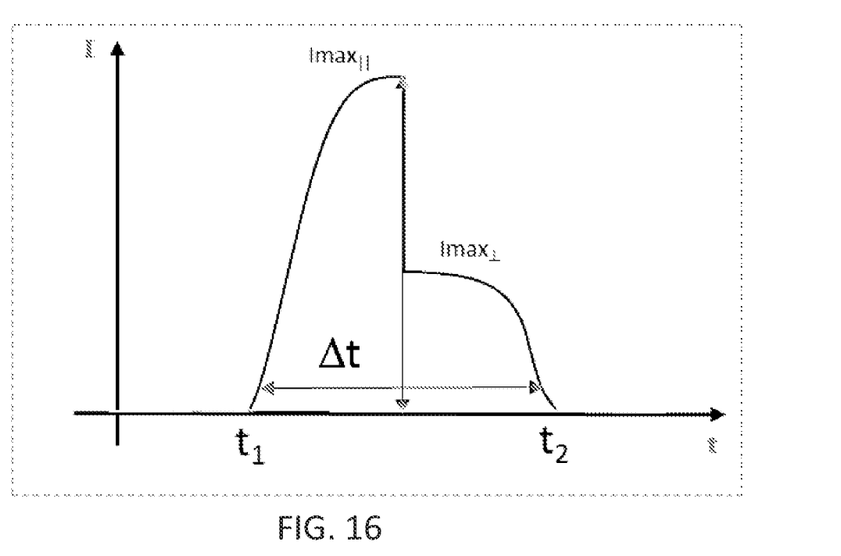
FIG. 16 shows an example of the collected light intensity for a non-spherical particle using the apparatus of FIG. 15.

FIG. 5 shows the flow control apparatus.

It shows the inlet 30 and outlet 32 of FIG. 3. The inlet is at atmospheric pressure, and the outlet is connected to the fan, such as a centrifugal fan (with a higher static pressure at low flow rate compared to a coaxial fan). The inlet and outlet pass into an enclosure 42, and filters 44 are provided within the enclosure, in particular on opposite sides of the flow channel.

The filters 44 are open to the exterior, so that they present a flow path from the outside to the inside of the enclosure 42. Thus, the flow out of the enclosure 42 is balanced by the flow in through the two filters and the flow through the inlet 30. The flow rate through the inlet 30, and thus the dilution rate of the incoming particle-laden air flow, depends on the characteristics of the filters, e.g. size, thickness, resistance coefficient etc.

Flow deflectors 46 are provided for shaping the flow streamlines to focus the particle trajectory from the inlet.

The design of the aerodynamic flow control apparatus part aims to generate a steady state accelerating flow field inside the measurement zone.

Particles with different aerodynamic diameter accelerate to different extent in an accelerating flow. This property is thus used to perform particle sizing with respect to aerodynamic diameter. Using a uniform flow field cannot achieve this goal, as all particles will settle to a same velocity profile in the measurement zone, and thus the same transit time.

The filters create a clean environment in the measurement zone to eliminate contamination by unwanted particles during light scattering measurements. This is especially helpful at each start-up of the system after it has been idle for a long time. They also dilute the incoming particle-laden air flow to ensure that, during any time, only one particle is present in the measurement zone (i.e. within the laser beam path). The dilution rate can be adjusted by changing the flow resistance (i.e. the material or thickness) of the filtration material.

The negative pressure induced by the fan 33 is set for example down to approximately −50 Pa.

FIG. 6 shows how the flow is controlled.

The flow has a reducing cross sectional area from the inlet 30 to the outlet 32, hence an increasing velocity along its axis. The air flow 50 through the filters 44 focuses the particle trajectory, and there is an acceleration towards the outlet 32 within the measurement zone 52 where the measurement takes place.

FIG. 7 shows the flow velocity profile in the measurement zone 52, as a plot of velocity versus distance along the flow path.

FIG. 8 shows the effect of particle density (which correlates to the effective aerodynamic diameter) on the velocity reached within the acceleration zone 52. It shows the relative velocity versus the distance from the inlet nozzle for a set of different particle densities ranging from 1.0 $g/cm^3$ to 2.0 $g/cm^3$ for particles with identical diameter of 10 μm, and uses particles of density 1.0 $g/cm^3$ as a baseline reference.

From this graph, the velocity difference with respect to the baseline can be determined (such as the vertical arrow 80 shown) at different distances from the inlet nozzle. The reference line (v=0) indicates the reference with particles having density 1 $g/cm^3$, and thus is set to 0 at all distances.

The other plots show the velocity difference for particles with density 1.2, 1.5, 1.8 and 2.0 $g/cm^3$ compared to the baseline reference. Larger particles accelerate more slowly than smaller particles, thus particles with higher density (i.e. larger aerodynamic diameter) have a more negative value as shown by arrow 80 for the most dense particle.

After the accelerating flow field, in the measurement zone, the velocity profile of the flow changes, so that the velocity differences then diminish and all particles settle in the flow field with the same terminal velocity. This is also shown in FIG. 8.

As explained above, the total time a particle traverses the measurement zone (i.e. the width of the signal Δt in FIG. 4) is used to characterize the aerodynamic diameter of the particle. To estimate the potential accuracy and stability of this algorithm, a sensitivity analysis is performed for the two relationships (i) terminal velocity to particle effective aerodynamic diameter, and (ii) transit time (in the measurement zone) to particle effective aerodynamic diameter.

The sensitivity (x) can be defined as [(dy/y)/(dx/x)] (x) for a relationship y=f(x).

This sensitivity defines the ratio of percentage of change in y and percentage of change in x at different values of x. A high sensitivity means that a change in x will cause a prominent change in y. Thus by measuring y, a more accurate determination of the value of x can be obtained with less interference from noise.

The sensitivity analysis is performed for particles with aerodynamic diameter ranging from 1 μm to 100 μm in steps of 1 μm and a uniform density $1.5\times10^3$ $kg/m^3$. The measurement zone length is 4 cm.

FIG. 9 shows the terminal velocity v (m/s) versus the particle diameter (m).

FIG. 10 shows the sensitivity S (unitless) of the terminal velocity versus the particle diameter (m).

FIG. 11 shows the pulse width W (ms) versus the particle diameter (m).

FIG. 12 shows the sensitivity S (unitless) of the pulse width versus the particle diameter (m).

In FIG. 10, the sensitivity of the relationship particle between the terminal velocity and particle effective aerodynamic diameter ranges from 0 to 0.5 (absolute value) with higher sensitivity for larger particles. The same conclusion can be drawn from FIG. 12 where the sensitivity of the relationship between particle transit time and particle effective aerodynamic diameter ranges from 0 to 0.25, also with larger particles having higher sensitivity.

This sensitivity analysis shows that the use of particle transit time to characterize particle aerodynamic is feasible and more sensitive (giving a more accurate and stable estimation) for larger particles.

The nature of the movement of the particles in the flow can be analyzed based on the drag force experienced by the particles.

The drag force is given by:

$$F_{drag} = \frac{3\pi\eta V_{set} d_p}{C_c(d_p)} \quad (1)$$

For a particle of interest:

$$\rho_p \frac{\pi}{6} d_{op}^3 g = \frac{3\pi\eta V_{set} d_{op} \chi}{C_c(d_{op})} \quad (2)$$

For a particle with standard density:

$$\rho_0 \frac{\pi}{6} d_{ae}^3 g = \frac{3\pi\eta V_{set} d_{ae}}{C_c(d_{ae})} \quad (3)$$

These two relationships can be combined to yield:

$$d_{ae} = d_{op} \sqrt{\frac{1}{\chi} \frac{\rho_p}{\rho_0} \frac{C_c(d_{op})}{C_c(d_{ae})}} \quad (4)$$

$\rho_p$ is the particle density
$\rho_0$ is the standard density
$\eta$ is the dynamic viscosity of air=$1.893 \times 10^{-5}$ Pa·s
$\chi$ is the dynamic shape factor (1 for a sphere, <1 for streamlined shape, >1 for most aerosol particles)
$V_{set}$ is the settling velocity (the relative velocity of the particle with respect to the carrier flow)
$C_c(d_p)$ is slip correction factor, which has a known relationship with respect to $d_p$ and can be approximated to 1 for particles larger than 1 micrometer
$d_{op}$ is the effective optical diameter
$d_{ae}$ is the effective aerodynamic diameter
$d_p$ is the generic particle diameter value used in the generic drag equation.

There are different options for processing the recorded data.

In a most basic version, the height and width of the scattered signal of FIG. 4 are measured, where the height of the signal is related to particle effective optical diameter, and the width of the signal (the transit time of the particle in the laser beam) is related to the effective particle aerodynamic diameter by the relationship shown in FIG. 10.

After obtaining the effective optical and aerodynamic diameters, the value under the root sign of Equation (4) can be derived for a specific particle.

In addition, as $Cc(d_{ae})$ and $Cc(d_{op})$ have known relationship with dependent variable d (i.e. $d_{ae}$ and $d_{op}$) and are close to one for micron-sized particles, the ratio of density ($\rho_p$) and shape factor ($\chi$) can be calculated as a single number.

This most basic approach provides one additional parameter which combines density and shape factor. This may be used to provide particle differentiation in that different particles will have different values for this parameter.

In this basic version, the measured variables are the effective optical diameter (derived from peak intensity) and the effective aerodynamic diameter (derived from the transit time). These are outputs from the system.

Known variables are $\rho_0$=1 g/cm$^3$, $Cc(d_{op})\approx1$, $Cc(d_{ae})\approx1$.

The calculated additional variable is the ratio of particle density ($\rho_p$) to shape factor ($\chi$). This is also provided as an output. The system can also output particle number concentration.

It would be more useful to be able to separate the particle density and shape information. Thus, in a more advance implementation, a particle shape factor may be obtained by analyzing a variation of the scattered light signal collected by the photon detector.

FIGS. 13 and 14 are used to explain a first approach.

FIG. 13 shows a collected signal for a non-spherical particle. The orientation of the particle influences the scattered light intensity in the direction of the photon detector, and this manifests itself as a variation in the intensity level during the period of the signal corresponding to the central area of the measurement zone.

FIG. 14 shows a collected signal for a spherical particle. The orientation of the particle does not influence the scattered light intensity in the direction of the photon detector, so the peak intensity has a period of constant amplitude. In each case, the peak intensity 120 recorded for the purposes of determining the effective optical diameter is the same.

A shape factor x can then be evaluated and hence the particle density can be separated from the shape factor. The deviation of the signal of FIG. 13 from a constant peak value may be obtained by any suitable statistical analysis, such as the peak deviation from the baseline level (shown dotted) or an area of deviation.

FIG. 15 is used to explain a second approach.

The optical system is enhanced by providing a first polarizer 150 in the path of the laser beam, before the measurement zone, and a second polarizer 152 is provided in the path to the photon detector 38.

The second polarizer has two portions 152*a*, 152*b* with orthogonal polarization. The first part 154 of the path of the particle within the measurement zone is detected based on light which has passed through the first portion 152*a*, and the second part 156 of the path of the particle is detected based on light which has passed through the second portion 152*b*. In this example, the first portion has a polarization aligned with the first polarizer, and the second portion has a polarization orthogonal to the first polarizer.

FIG. 16 shows an example of the collected light intensity for a non-spherical particle.

During a first part of the time period a light intensity is measured for light that has passed though aligned polarizers, with a maximum intensity shown as $I_{max}\|$. During a second part of the time period a light intensity is measured for light that has passed though crossed polarizers, with a maximum intensity shown as $I_{max\perp}$. In this case, only light that has undergone a polarization rotation between the polarizers can be collected.

For spherical particles, the scattered light will maintain its original polarization along each of the two orthogonal directions. For non-spherical particles, a portion of the scattered light will experience a change in polarization, hence yields a cross contribution of polarized components between the two orthogonal directions.

The two polarized components of the scattering field depend on the S-matrix $$\begin{pmatrix} E_{\|s} \\ E_{\perp s} \end{pmatrix} = \frac{e^{ik(r-z)}}{-ikr} \begin{bmatrix} S_2 & S_3 \\ S_4 & S_1 \end{bmatrix} \cdot \begin{pmatrix} E_{\|i} \\ E_{\perp i} \end{pmatrix}$$

For spherical particles, $S_3=S_4=0$, so that the two polarization components in the incident and scattered light will not interact. For non-spherical particles, $S3=S4\neq 0$, the two polarization components will interact. i.e. the parallel component in the incident light will contribute to both parallel and perpendicular components in scattered light.

A shape measure may be defined as:

$$P \equiv \frac{I\max_\| - I\max_\perp}{I\max_\| + I\max_\perp} = f(\chi)$$

For spherical particles, $I_{max\perp}=0 \Rightarrow P=1$. For non-spherical particles, $I\max_\perp > 0 \Rightarrow P<1$.

Thus, the parameter P provides a measure of the shape of a particle from which an estimate is obtained for shape factor $\chi$ and hence the particle density can be separated from the shape factor.

In this approach, the measured variables are the effective optical diameter (based on the peak intensity), the effective aerodynamic diameter (based on the transit time) and the shape factor ($\chi$) (based on the shape of the intensity plot). These are outputs by the system.

The known variables are again $\rho_0=1$ g/cm$^3$, $Cc(d_{op})\approx 1$, $Cc(d_{ae})\approx 1$.

The calculated variable is the particle density ($\rho_p$) which is also output from the system, again also with a particle count.

The retrieval of the effective aerodynamic diameter as well as the shape factor using either of these approaches requires a wide incident laser beam (of the order of millimeters or centimeters) compared to a typical narrow laser beam (of the order of micrometers).

Figure 17:
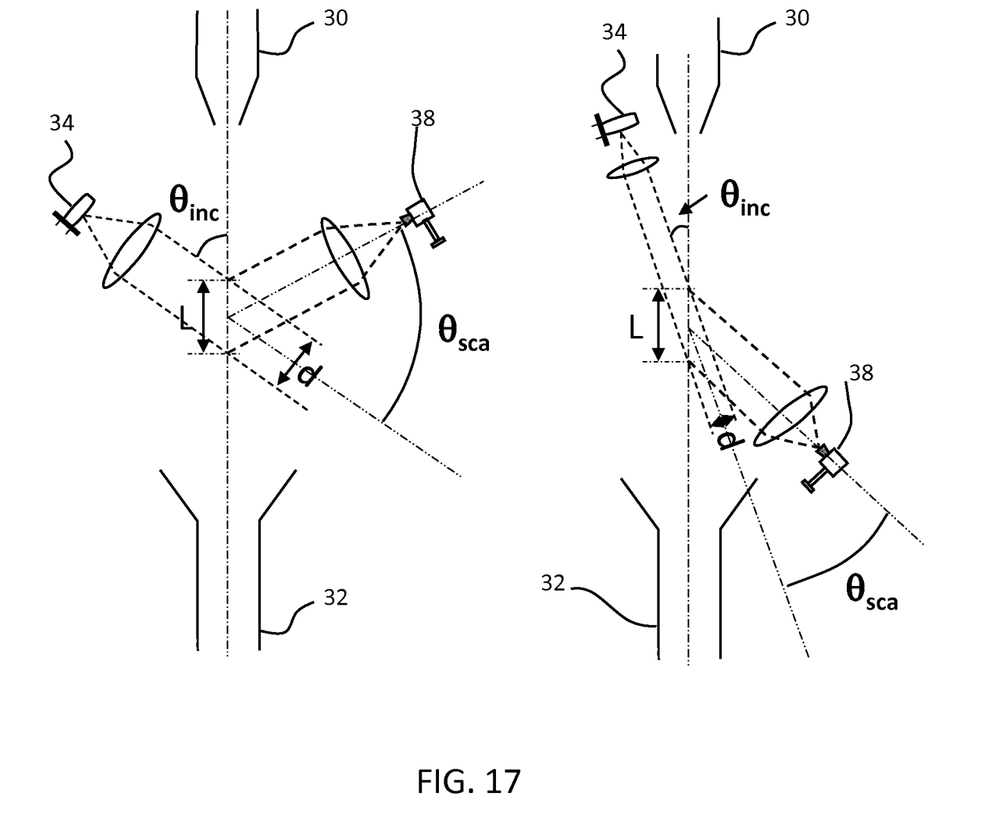
FIG. 17 shows parameters associated with the optical arrangement of FIG. 3 and shows how decreasing the angle of incidence $\theta_{mc}$ can increase irradiance while maintaining the length of the measurement zone L.

The left part of FIG. 17 shows parameters associated with the optical arrangement of FIG. 3, in particular the laser beam width d and the path length L in the measurement zone. The angle between the incident beam and the flow path is shown as $\theta_{inc}$. The scattering angle between the incident beam and the photon detector is shown as $\theta_{sca}$.

The right part of FIG. 17 shows the effect of decreasing the angle of incidence.

For a given path length L and laser power, and beam width d can be decreased, so that the irradiance can be increased giving a higher signal to noise ratio.

The scattering angle $\theta_{sca}$ can also be decreased to increase the scattering intensity reaching the photon detector, as there is more forward scattering for particles with size larger than 0.5 µm.

By way of example, preferred ranges for $\theta_{inc}$ are 15 to 25° such as 20°. Preferred ranges for $\theta_{sca}$ are 20 to 40° such as 30°. The length L has the order of centimeters, such as 1 cm to 6 cm, such as 2 cm. A suitable range for d is L/3 to L/4.

The system will be calibrated with respect to:

The signal height to effective optical diameter relationship;

The signal width to effective aerodynamic diameter relationship;

The signal variation to shape factor relationship (when used); and

The parameter P to shape factor relationship (when used).

Figure 18:
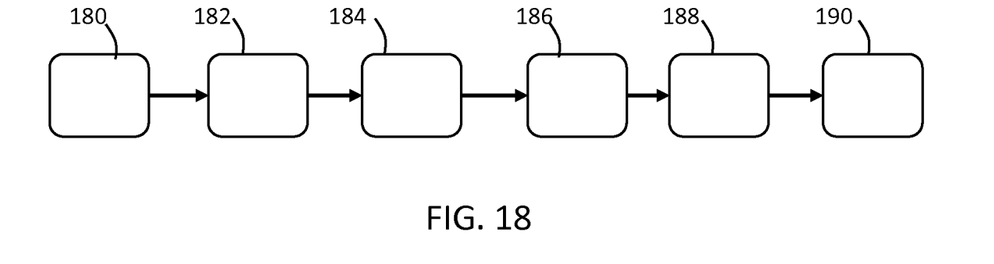
FIG. 18 shows a method of determining particle characteristics.

FIG. 18 shows a method for obtaining particle characteristics, comprising:

in step 180, generating an accelerating flow containing particles between an inlet and an outlet;

in step 182, controlling a laser light source to provide light to a measurement zone of the flow path;

in step 184, detecting light received from the measurement zone which has been scattered by the particles;

in step 186, determining a time duration for which a particle remains in the measurement zone and thereby determining an effective aerodynamic particle diameter;

in step 188, determining a peak detected received light intensity and thereby determining an effective optical particle diameter; and in step 190, determining a further particle parameter relating to the shape and/or density of the particle.

As discussed above, embodiments make use of a controller 41. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

The invention makes use of a wide light source illumination beam and enables effective aerodynamic diameter, effective optical diameter and shape factor all to be achieved in one shot. With this design, the sensor can be made with a small footprint and reasonable sensitivity (compared to a professional mass spectrometry system).

The examples above show a measurement zone with continuous illumination. An alternative is to splitting a beam into two to define an envelope with two portions. The length of the measurement zone can then be increased in return for a higher sensitivity for aerodynamic diameter measurement, while retaining the shape determination function. For example a 4 cm beam may be split into a 2 cm laser+2 cm void+2 cm laser envelope with a measurement zone length of 6 cm.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An apparatus for determining particle characteristics, the apparatus comprising:
   an inlet and an outlet;
   a flow system for generating a flow path between the inlet and the outlet along which an accelerating flow is to be provided containing particles to be analyzed;
   a light source for providing light to the flow path, wherein the envelope of the light defines a measurement zone, the measurement zone having a length of more than 1 cm;
   a light detector for detecting light received from the measurement zone which has been scattered by the particles; and
   a controller for analyzing the detected received light,
   wherein, for a particle of the particles, the controller is adapted to:
      determine an effective aerodynamic particle diameter of the particle from a time duration for which the particle remains in the measurement zone;
      determine an effective optical particle diameter of the particle from a peak detected received light intensity;
      analyze a determined effective aerodynamic particle diameter and a determined effective optical particle diameter; and
      determine a particle parameter relating to at least one of a shape of the particle and a density of the particle from an analysis of the determined effective aerodynamic particle diameter and the determined effective optical particle diameter.

2. The apparatus as claimed in claim 1, wherein the controller is further adapted to:
   determine the particle parameter as a ratio between a shape parameter of the particle and the density of the particle derived from the analysis of the determined effective aerodynamic particle diameter and the determined effective optical particle diameter.

3. The apparatus as claimed in claim 2, wherein the controller is adapted to:
   derive a shape parameter of the particle from a level of variation of the detected received light intensity over time; and
   derive the particle density of the particle from a derived shape parameter of the particle.

4. The apparatus as claimed in claim 1, further comprising:
   a first polarizer between the light source and the measurement zone; and
   a second polarizer between the measurement zone and the light detector, wherein the second polarizer has a first portion with a matching polarization to the first polarizer and a second portion with an orthogonal polarization to the first polarizer.

5. The apparatus as claimed in claim 4, wherein the controller is adapted to:
   derive a shape parameter of the particle from the peak detected received light intensity through the first and second portions of the second polarizer; and
   derive the particle density of the particle from a derived shape parameter of the particle.

6. The apparatus as claimed in claim 1, wherein the flow system includes a fan connected to the outlet, and wherein the apparatus further comprises:
   an outer enclosure;
   a filter arrangement coupled to a further pair of inlets; and
   a flow deflector arrangement for controlling the flow from the filter arrangement and for controlling the flow path.

7. The apparatus as claimed in claim 6,
   wherein the filter arrangement includes first and second filters on opposite sides of the flow path; and
   wherein the flow deflector arrangement includes corresponding first and second flow deflectors.

8. The apparatus as claimed in claim 1, wherein the flow system is adapted to provide a uniform acceleration of the flow along the flow path within the measurement zone.

9. A method for obtaining particle characteristics, the method comprising:
   generating an accelerating flow containing particles along a flow path between an inlet and an outlet;
   controlling a light source to provide light to the flow path, wherein the envelope of the light defines a measurement zone, the measurement zone having a length of between 1 cm and 6 cm;
   detecting light received from the measurement zone which has been scattered by the particles;
   determining an effective aerodynamic particle diameter of a particle of the particles from a time duration for which the particle remains in the measurement zone thereby;
   determining an effective optical particle diameter of the particle from a peak detected received light intensity;
   analyzing a determined effective aerodynamic particle diameter and a determined effective optical particle diameter; and
   determine a particle parameter relating to at least one of a shape parameter of the particle and a particle density of the particle from the analyzing of the determined effective aerodynamic particle diameter and the determined effective optical particle diameter.

10. The method as claimed in claim 9,
    wherein the particle parameter is determined as a ratio between a shape parameter of the particle and the density of the particle from the analyzing of the determined effective aerodynamic particle diameter and the determined effective optical particle diameter.

11. The method as claimed in claim 10, further comprising:
    analyzing a level of variation of the detected received intensity over time to derive a shape parameter of the particle; and
    deriving the density of the particle from the derived shape parameter of the particle.

12. The method as claimed in claim 9, further comprising:
    providing polarization of the light between before the measurement zone using a first polarizer;
    providing polarization of the light after the measurement zone using a second polarizer having a first portion with a matching polarization to the first polarizer and a second portion with an orthogonal polarization to the first polarizer;
    analyzing the peak detected received light intensity through the first and second portions of the second polarizer to derive a shape parameter of the particle; and
    deriving the density of the particle from the derived shape parameter of the particle.

13. The method as claimed in claim 9, further comprising:
    filtering an air flow towards the measurement zone to thereby to control the flow path.

14. The method as claimed in claim 9, further comprising:
    providing a uniform acceleration of the flow along the flow path within the measurement zone.

15. A computer program comprising computer program code means which is adapted, when said computer program is run on a computer, to perform the method of claim 9.

* * * * *